United States Patent
Shah et al.

(10) Patent No.: US 6,190,632 B1
(45) Date of Patent: Feb. 20, 2001

(54) METHOD AND APPARATUS FOR THE PRODUCTION OF AMMONIA UTILIZING CRYOGENIC RECTIFICATION

(75) Inventors: Minish Mahendra Shah, East Amherst; Raymond Francis Drnevich, Clarence Center, both of NY (US)

(73) Assignee: Praxair Technology, Inc., Danbury, CT (US)

(*) Notice: Under 35 U.S.C. 154(b), the term of this patent shall be extended for 0 days.

(21) Appl. No.: 09/257,030

(22) Filed: Feb. 25, 1999

(51) Int. Cl.[7] .................... C01C 1/04; C21B 5/06
(52) U.S. Cl. .................... 423/352; 75/458; 252/374; 252/375; 252/377; 423/359; 422/148; 422/188
(58) Field of Search ................... 423/352, 359; 252/374, 375, 377; 75/458, 466, 468; 422/148, 188

(56) References Cited

U.S. PATENT DOCUMENTS

| 3,872,025 | * | 3/1975 | Singleton | 252/373 |
| 4,013,454 | | 3/1977 | Jordan | 75/41 |
| 4,363,654 | | 12/1982 | Frederick et al. | 75/34 |
| 4,409,196 | * | 10/1983 | Skinner et al. | 423/359 |
| 5,582,029 | | 12/1996 | Occhialini et al. | 62/636 |
| 5,582,036 | | 12/1996 | Drnevich et al. | 62/656 |
| 6,045,602 | * | 4/2000 | Shah | 75/466 |

FOREIGN PATENT DOCUMENTS

| 0126961 | 12/1984 | (EP) . |
| 271464 | 6/1988 | (EP) . |
| 9728284 | 7/1997 | (WO) . |

* cited by examiner

Primary Examiner—Steven P. Griffin
Assistant Examiner—Maribel Medina
(74) Attorney, Agent, or Firm—Donald T. Black

(57) ABSTRACT

A system for producing ammonia by integrating blast furnace ironmaking with ammonia production wherein cryogenic rectification links the two systems enabling the production of ammonia synthesis gas from blast furnace gas for use in the ammonia production.

8 Claims, 2 Drawing Sheets

METHOD AND APPARATUS FOR THE PRODUCTION OF AMMONIA UTILIZING CRYOGENIC RECTIFICATION

TECHNICAL FIELD

The invention relates generally to the production of ammonia and, more particularly, to the production of ammonia synthesis gas from a blast furnace and the use of cryogenic rectification to enable the use of such synthesis gas for ammonia production.

BACKGROUND ART

In the operation of a blast furnace, coke is partially oxidized with air and the resulting reducing gases are used to reduce iron ore to produce iron. Modern furnace operation includes enrichment of the air with oxygen and the addition of other hydrocarbons such as coal or natural gas. The off gases from the blast furnace contain some heating value and are generally used as a fuel for power and steam generation. While this is an effective use for this gas, it is desirable to have a better use for this gas, especially in light of expected reductions in the cost of electricity available through the power grid.

Accordingly, it is an object of this invention to provide a method whereby the off gases from a blast furnace may be effectively employed to produce ammonia.

SUMMARY OF THE INVENTION

In general the invention serves to effectively integrate a blast furnace with an ammonia production plant using cryogenic rectification to effect the integration. The cryogenic rectification improves the blast furnace operation and enables off gas from the blast furnace to be used to produce ammonia.

The above and other objects and advantages, which will become apparent to one skilled in the art upon a reading of this disclosure, are attained by the present invention one aspect of which is:

A method for producing ammonia using cryogenic rectification comprising:

(A) separating air in a cryogenic air separation plant by cryogenic rectification to produce oxygen;

(B) mixing oxygen from the cryogenic air separation plant with air to form blast air comprising from about 22 to 50 mole percent oxygen with the remainder comprised primarily of nitrogen;

(C) passing the blast air into a blast furnace and combusting oxygen of the blast air with hydrocarbon in the blast furnace to produce blast furnace gas comprising nitrogen, carbon monoxide and hydrogen;

(D) reacting the carbon monoxide with steam to produce carbon dioxide and additional hydrogen, and removing the carbon dioxide from the blast furnace gas to produce fortified blast furnace gas comprising nitrogen and hydrogen;

(E) passing the fortified blast furnace gas into a cryogenic rectification plant and separating the fortified blast furnace gas within the cryogenic rectification plant to produce ammonia syntheses gas comprising hydrogen and nitrogen in about at 3 to 1 ratio; and (F) passing ammonia synthesis gas from the cryogenic rectification plant to an ammonia production plant and reacting hydrogen and nitrogen of the ammonia synthesis gas within the ammonia production plant to produce ammonia.

Another aspect of the invention is:

Apparatus for producing ammonia comprising:

(A) a cryogenic air separation plant and means for passing feed air into the cryogenic air separation plant;

(B) a blast furnace, means for passing oxygen from the cryogenic air separation into the blast furnace, and means for passing fuel into the blast furnace;

(C) a water gas shift reaction section, means for passing blast furnace gas from the blast furnace to the water gas shift reaction section, and means for passing steam into the water gas shift reaction section;

(D) a carbon dioxide removal unit and means for passing gas from the water gas shift reaction section to the carbon dioxide removal unit;

(E) a cryogenic rectification plant and means for passing gas from the carbon dioxide removal unit into the cryogenic rectification plant; and (F) an ammonia production plant, means for passing gas from the cryogenic rectification plant into the ammonia production plant, and means for recovering ammonia from the ammonia production plant.

As used herein, the term "iron ore" means one or more oxides of iron such as ferric oxide and ferrous oxide.

As used herein, the term "column" means a distillation or fractionation column or zone, i.e. a contacting column or zone, wherein liquid and vapor phases are countercurrently contacted to effect separation of a fluid mixture, as for example, by contacting of the vapor and liquid phases on a series of vertically spaced trays or plates mounted within the column and/or packing elements such as structured or random packing.

As used herein, the term "cryogenic rectification plant" means a separation plant wherein at least part of the operation of the plant is carried out at temperatures at or below 150 degrees Kelvin (K).

As used herein, the term "cryogenic air separation plant" means a cryogenic rectification plant comprising at least one column and wherein feed air is separated to produce at least one of product oxygen and product nitrogen.

DETAILED DESCRIPTION

The invention will be described in detail with reference to the Drawings.

Figure 1:
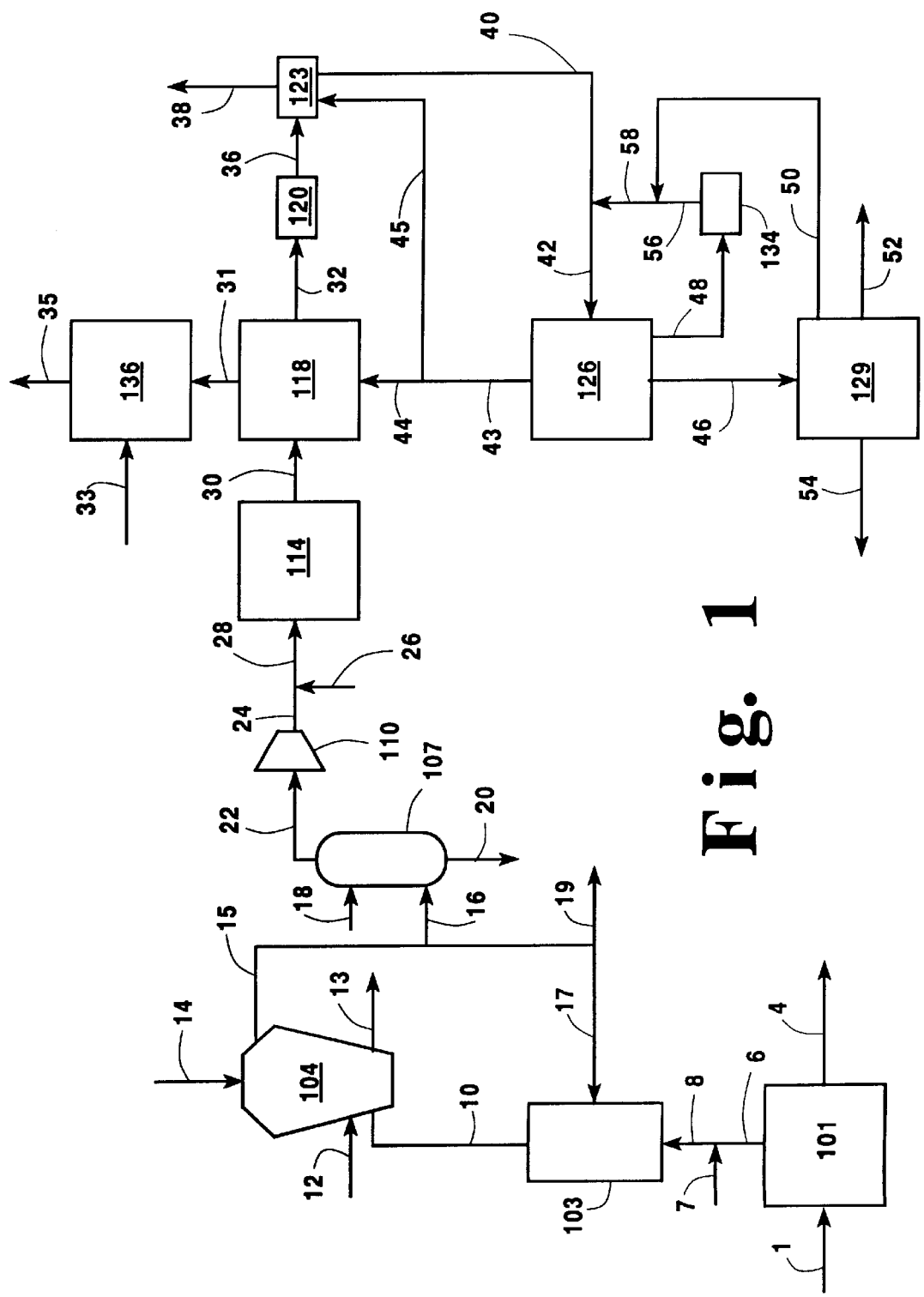
FIG. 1 is a simplified schematic block flow representation of one preferred embodiment of the method of this invention wherein carbon dioxide removal is carried out using a pressure swing adsorption unit.

Referring now to FIG. 1, feed air 1 comprised primarily of nitrogen and oxygen and also containing other normal constituents of air such as argon, is passed into cryogenic air separation plant 101 wherein it is separated by cryogenic rectification to produce oxygen. Cryogenic air separation plant 101 may be any effective cryogenic air separation plant. Preferably cryogenic air separation plant 101 is a double column plant comprising a higher pressure column and a lower pressure column in heat exchange relation wherein the feed air undergoes a preliminary separation by cryogenic rectification in the higher pressure column into oxygen-enriched fluid and nitrogen-enriched fluid, and these fluids are then passed into the lower pressure column wherein they undergo a final separation by cryogenic rectification into product oxygen and product nitrogen. The cryogenic air separation plant may also employ other columns such as an argon sidearm column wherein product argon may be produced.

Nitrogen is withdrawn from cryogenic air separation plant 101 in stream 4 which may be recovered, in whole or in part, or released to the atmosphere. Product oxygen, having an oxygen concentration ranging from that of enriched air to higher purity, i.e. generally within the range of from 40 to 99.9 mole percent, is withdrawn from cryogenic air separation plant in stream 6. The oxygen from the cryogenic air separation plant is mixed with air from stream 7 to produce oxygen-enriched air or blast air 8. The blast air has an oxygen concentration generally within the range of from 22 to 50 mole percent with the remainder comprised primarily of nitrogen.

Blast air 8 is heated in stoves 103 to a temperature generally within the range of from 1500 to 2200° F. and the resulting hot blast air 10 is passed into blast furnace 104 along with hydrocarbon 12 which may be coal, oil or natural gas. Also passed into blast furnace 104 is furnace charge 14 comprising iron ore, coke and flux materials. The oxygen of the blast air reacts with hydrocarbon fuel within the blast furnace generating heat and producing a reducing gas which converts the iron ore to iron as the gas flows up through the furnace. Molten iron and slag are removed from the bottom of furnace 104 in line 13 and the gas, generally termed blast furnace gas and comprising nitrogen, carbon monoxide, carbon dioxide and hydrogen, is collected in the upper portion of blast furnace 104 and withdrawn from furnace 104 is stream 15.

It is an important aspect of this invention that the blast air, while having an oxygen concentration which exceeds that of air, also contain a significant level of nitrogen, preferably of about 50 mole percent or more. This accomplishes two beneficial results. It enables the blast furnace to operate without need for significant alteration from that of conventional practice wherein air is the sole source of oxygen, and also serves as a source of nitrogen which is beneficially employed downstream in the production of ammonia.

Referring back now to FIG. 1, a portion 17 of blast furnace off-gas 15 is passed to stoves 103 wherein it is burned to provide heat to heat the blast air. Another portion 19 can be used as fuel in other units. The remaining portion 16 of blast furnace off-gas 15 is passed into the lower portion of wash tower 107. Water is passed into the upper portion of wash tower 107 in stream 18 and passes down wash tower 107 against upflowing blast furnace gas and, in the process, particulate impurities within the blast furnace gas are washed into the downflowing water and the blast furnace gas is cooled to a temperature generally within the range of from 40 to 150° F. The wash water is removed from wash tower 107 in stream 20.

Cooled blast furnace gas is withdrawn from the upper portion of wash tower 107 in stream 22 and passed to compressor 110 wherein it is compressed to a pressure generally within the range of from 100 to 500 pounds per square inch absolute (psia). The resulting pressurized blast furnace gas in stream 24 is mixed with steam at substantially the same pressure to form water gas shift reaction stream 28. The steam in stream 26 is added to the pressurized blast furnace gas stream 24 at a rate such that the ratio of water to carbon monoxide in water gas shift reaction stream 28 is within the range of from 2 to 5. Preferably, streams 24 and 26 are each heated to about 600° F. before they are mixed to form stream 28.

Water gas shift reaction stream 28 is passed into shift reaction section 114 which preferably comprises high temperature and lower temperature shift reactors in series with heat exchangers after each shift reactor. As the water gas shift reaction mixture passes through the shift reactors, the carbon monoxide reacts with steam in an exothermic reaction to produce carbon dioxide and hydrogen. The resulting blast furnace gas comprising nitrogen, carbon dioxide and hydrogen is then passed in stream 30 from water gas shift reaction section 114 to pressure swing adsorption system 118 which comprises one or more beds of adsorbent particles which preferentially adsorb carbon dioxide. Among such adsorbent materials one can name activated carbon and zeolites.

As the blast furnace gas passes through pressure swing adsorption system 118, carbon dioxide is removed from the blast furnace gas by being preferentially adsorbed onto the adsorbent. The resulting fortified blast furnace gas comprising nitrogen and hydrogen is withdrawn from pressure swing adsorption system in stream 32.

Stream 32 may contain up to 500 ppm of carbon dioxide and will also contain some water. Stream 32 is passed into methanation section 120 wherein the gas is preheated and then added to a methanator. Within the methanator all the residual carbon monoxide and carbon dioxide reacts with hydrogen to produce methane. The gas mixture from methanation section 120 is passed in stream 36 to dryer 123 for the removal of the water. Resulting fortified blast furnace gas is withdrawn from dryer 123 in stream 40 and combined with recycle stream 58 to form stream 42 which is fed into cryogenic rectification plant 126. Preferably cryogenic rectification plant 126 comprises a heat exchanger wherein the feed is partially condensed and then phase separated to effect the separation. However, the plant could combine the heat exchange and phase separation with further column separation. Within the cryogenic rectification plant 126 the feed 42 is separated by cryogenic rectification into ammonia synthesis gas 46 containing hydrogen and nitrogen in about a 3 to 1 ratio with very small amounts of argon and methane, residual nitrogen 43 having a nitrogen concentration of about 98 mole percent with the remainder being mostly argon, methane and hydrogen, and impure hydrogen 48 having a hydrogen concentration generally within the range of from 10 to 50 mole percent.

Ammonia synthesis gas is passed from cryogenic rectification plant 126 in stream 46 to ammonia production plant 129.

In ammonia plant 129, ammonia synthesis make-up gas and recycle synthesis gas are compressed and heated and then fed to an ammonia converter. In the converter hydrogen and nitrogen react to produce ammonia. Due to the exothermic reaction, heat is produced. This heat is used to produce stream. Per pass conversion into ammonia may vary from 15–30%. More steam is produced while cooling the converter outlet gas. It is further cooled by exchanging heat with feed gas to the converter and then by cooling water. Finally, a chiller is used to cool it further to separate liquid ammonia product. Gas from this separator contains unconverted hydrogen and nitrogen and inerts (argon and methane). A small portion of this gas is purged from the loop to prevent buildup of inerts. One of the beneficial aspects of the invention is that most of the inerts are removed (more than 95% methane and more than 85% argon) in unit 126 where ammonia synthesis gas is produced. As a result, the amounts of inerts entering the ammonia synthesis loop are very small and hence the amount of gas that needs to be purged is very small. Due to lower concentrations of inerts in the synthesis loop, per pass conversion to ammonia is also improved. The balance of gas (after purge gas is removed) is called recycle synthesis gas which was mentioned earlier. Liquid ammonia product is throttled to a lower pressure to release dissolved gas. This gas and purge gas are combined and ammonia from it is removed by refrigeration. Any moisture present in this gas is removed by a dryer. The dried gas forms recycle stream 50, which is sent to cryogenic rectification unit 126.

Impure hydrogen 48 from plant 126 is passed to compressor 134 and resulting compressed stream 56 is combined with recycle stream 50 containing about 60 to 90 mole percent hydrogen and at about 250 psia from plant 129 to form the aforesaid recycle stream 58 into cryogenic rectification plant 126. Product ammonia is recovered from plant 129 in stream 52 and steam, which is produced as a by-product from the ammonia production, is removed from plant 129 in stream 54 which may be recovered in whole or in part.

Residual nitrogen is withdrawn from cryogenic rectification plant 126 in stream 43. The major portion 44 of stream 43 is passed through pressure swing adsorption unit 118 wherein it serves to regenerate adsorbent which has become loaded with carbon dioxide by desorbing the carbon dioxide from the adsorbent into the residual nitrogen stream. A minor portion 45 of stream 43 is passed through dryer 123 wherein it serves to regenerate adsorbent which has become loaded with water by desorbing the water from the adsorbent into the residual nitrogen stream which is then vented as stream 38. Resulting waste nitrogen stream 31 from unit 118 may be vented or, as illustrated in FIG. 1, may be passed into catalytic oxidation reactor 136 wherein oxygen from stream 33 reacts with any remaining carbon monoxide to form carbon dioxide before the residual nitrogen stream is vented as stream 35.

It is an important aspect of this invention that the nitrogen which is used to regenerate the carbon dioxide removal system come from a cryogenic nitrogen-hydrogen separation and not from an air separation plant. Nitrogen from an air separation plant would be required at higher purity than that of stream 43; otherwise the nitrogen from the air separation plant could potentially introduce oxygen into the carbon dioxide removal system and thus ultimately into the fortified blast furnace gas from which the hydrogen for the ammonia production is taken. Such a presence of oxygen could prove hazardous, and the invention which uses two separate cryogenic rectification plants obviates any such potential hazard.

Figure 2:
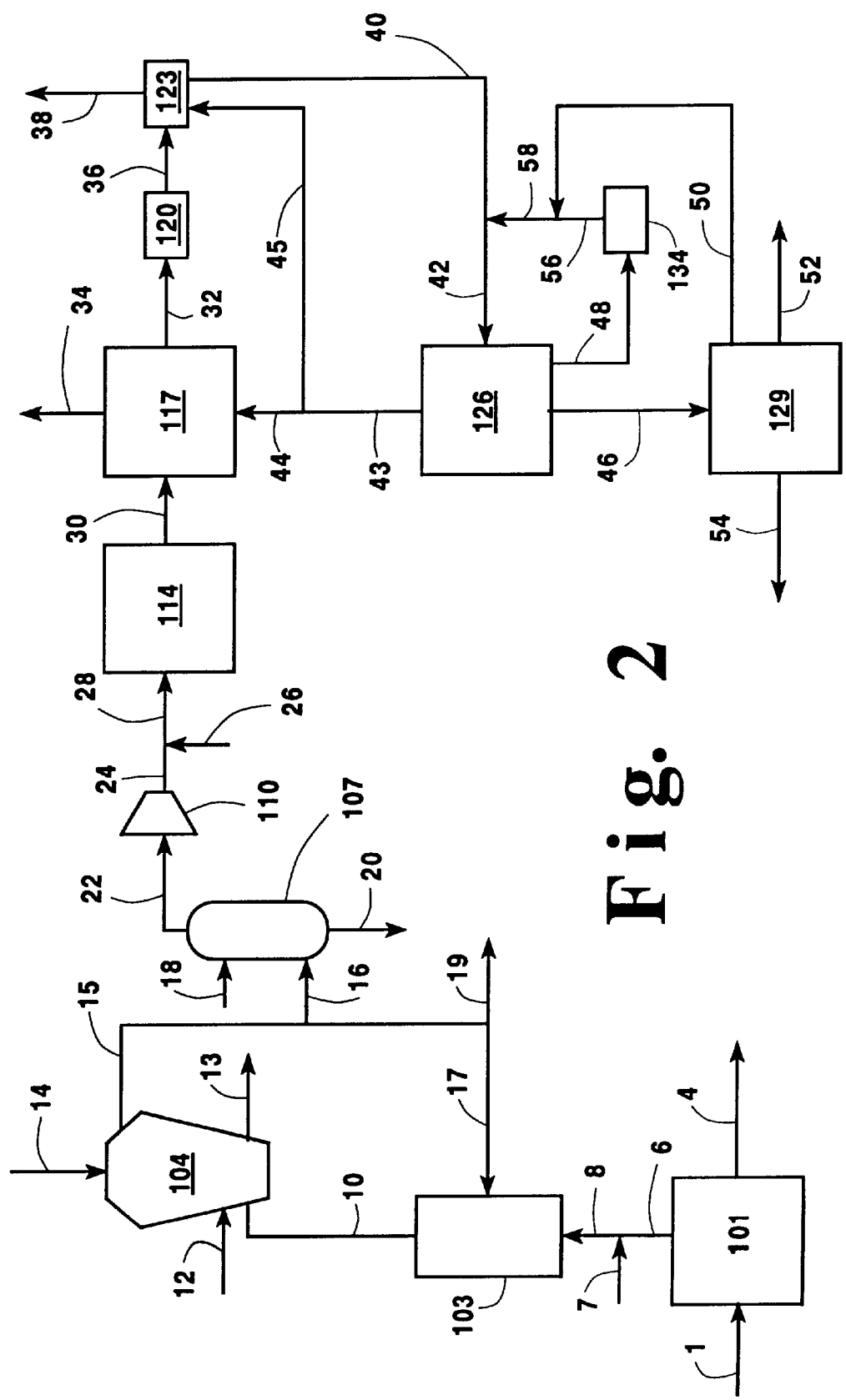
FIG. 2 is a simplified schematic block flow representation of another preferred embodiment of the method of this invention wherein carbon dioxide removal is carried out using a hot potassium carbonate system.

FIG. 2 illustrates another embodiment of the invention wherein the carbon dioxide removal system is an absorbent system such as a hot potassium carbonate system rather than a pressure swing adsorption system. The numerals in FIG. 2 are the same as those in FIG. 1 for the common elements and these common elements will not again be described in detail.

Referring now to FIG. 2, blast furnace gas stream 30 is passed from water gas shift reaction section 114 to acid gas removal system 117 which comprises an absorber and stripper using hot potassium carbonate solution as a solvent. The solvent removes carbon dioxide from gas mixture 30 in an absorber tower. The solvent is regenerated in the stripper tower by using steam and residual nitrogen from stream 44 and the resulting mixture of carbon dioxide and residual nitrogen is vented as stream 34. Fortified blast furnace gas in stream 32 which may contain about 500 ppm of carbon dioxide is passed into methanation section 120 wherein the gas is preheated and then added to a methanator. Within the methanator all the residual carbon monoxide and carbon dioxide reacts with hydrogen to produce methane. The gas mixture from the methanation section 120 is passed in stream 36 to dryer 123 which removes water from the gas mixture and the resulting fortified blast furnace gas is withdrawn from dryer 123 in stream 40. Dryer 123 is regenerated by residual nitrogen stream 45 and the mixture of nitrogen and water is vented from dryer 123 in stream 38. Residual nitrogen in this embodiment contains hydrogen and methane as impurities.

Although the invention has been described in detail with reference to certain preferred embodiments, those skilled in the art will recognize that there are other embodiments of the invention within the spirit and the scope of the claims. For example, the cryogenic air separation plant need not be dedicated to the production of oxygen for the blast furnace but, rather, could produce oxygen for passage into a pipeline from which the oxygen could be passed not only to the blast furnace but also to other use points. The feed air into the cryogenic air separation plant could be obtained from a blast air blower designed to feed air to the blast furnace. Argon and/or methane may also be recovered from the cryogenic rectification plant or passed into the ammonia production plant and, since they are inerts in the production of ammonia, may be recovered from the ammonia production plant.

What is claimed is:

1. A method for producing ammonia employing cryogenic rectification comprising:

(A) separating air in a cryogenic air separation plant by cryogenic rectification to produce oxygen;

(B) mixing oxygen from the cryogenic air separation plant with air to form blast air comprising from about 22 to 50 mole percent oxygen with the remainder comprised primarily of nitrogen;

(C) passing the blast air into a blast furnace and combusting oxygen of The blast air with hydrocarbon in the blast furnace to produce blast furnace gas comprising nitrogen, carbon monoxide and hydrogen;

(D) passing said blast furnace gas from said blast furnace to a shift reaction section wherein the carbon monoxide is reacted with steam to produce carbon dioxide and additional hydrogen, and then passing the carbon dioxide onto or into material to remove the carbon dioxide from the blast furnace gas to produce fortified blast furnace gas comprising nitrogen and hydrogen;

(E) passing the fortified blast furnace gas into a cryogenic rectification plant and separating the fortified blast furnace gas within the cryogenic rectification plant to produce ammonia synthesis gas comprising hydrogen and nitrogen in about a 3 to 1 ratio and residual nitrogen;

(F) passing ammonia synthesis gas from the cryogenic rectification plant to an ammonia production plant and reacting hydrogen and nitrogen of the ammonia synthesis gas within the ammonia production plant to produce ammonia; and (G) passing residual nitrogen from the cryogenic rectification plant in contact with said material and passing the carbon dioxide from said material into the residual nitrogen.

2. The method of claim 1 wherein the removal of the carbon dioxide from the blast furnace gas is carried out by adsorbing carbon dioxide from the blast furnace gas onto adsorbent.

3. The method of claim 1 wherein the removal of the carbon dioxide from the blast furnace gas is carried out by absorbing carbon dioxide from the blast furnace gas into a potassium carbonate solution.

4. The method of claim 1 further comprising passing a recycle stream from the ammonia production plant into the cryogenic rectification plant.

5. Apparatus for producing ammonia comprising:

(A) a cryogenic air separation plant and means for passing feed air into the cryogenic air separation plant;

(B) a blast furnace, means for passing oxygen from the cryogenic air separation plant into the blast furnace, and means for passing fuel into the blast furnace;

(C) a water gas shift reaction section, means for passing blast furnace gas from the blast furnace to the water gas shift reaction section, and means for passing steam into the water gas shift reaction section;

(D) a carbon dioxide removal unit and means for passing gas from the water gas shift reaction section to the carbon dioxide removal unit;

(E) a cryogenic rectification plant and means for passing gas from the carbon dioxide removal unit into the cryogenic rectification plant; wherein the cryogenic rectification plant produces ammonia synthesis gas and residual nitrogen; and means for passing residual nitrogen from the cryogenic rectification plant to the carbon dioxide removal unit for regenerating said unit; and (F) an ammonia production plant, means for passing ammonia synthesis gas from the cryogenic rectification plant into the ammonia production plant, and means for recovering ammonia from the ammonia production plant.

6. The apparatus of claim 5 wherein the carbon dioxide removal unit is a pressure swing adsorption unit wherein carbon dioxide is adsorbed onto adsorbent particles.

7. The apparatus of claim 5 wherein the carbon dioxide removal unit is a hot potassium carbonate system wherein carbon dioxide is passed into hot potassium carbonate solvent.

8. The apparatus of claim 5 further comprising means for passing gas from the ammonia production plant to the cryogenic rectification plant.

* * * * *